United States Patent
Shibata et al.

(10) Patent No.: US 10,536,588 B2
(45) Date of Patent: Jan. 14, 2020

(54) IMAGE FORMING APPARATUS

(71) Applicant: KYOCERA Document Solutions Inc., Osaka (JP)

(72) Inventors: Yukihiro Shibata, Osaka (JP); Akira Ohashi, Osaka (JP); Koji Tagaki, Osaka (JP); Satoshi Sato, Osaka (JP); Yuki Yamamoto, Osaka (JP); Yusuke Okazaki, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 16/351,706

(22) Filed: Mar. 13, 2019

(65) Prior Publication Data

US 2019/0297200 A1 Sep. 26, 2019

(30) Foreign Application Priority Data

Mar. 22, 2018 (JP) .................. 2018-054623

(51) Int. Cl.
*H04N 1/00* (2006.01)

(52) U.S. Cl.
CPC ..... *H04N 1/00323* (2013.01); *H04N 1/00896* (2013.01); *H04N 1/00912* (2013.01)

(58) Field of Classification Search
CPC ........... H04N 1/00323; H04N 1/00896; H04N 1/00912

USPC .................................................. 358/1.15
See application file for complete search history.

(56) References Cited

U.S. PATENT DOCUMENTS

| 9,319,149 | B2* | 4/2016 | Luna | H04M 1/7253 |
| 2015/0237227 | A1* | 8/2015 | Saisho | H04N 1/00875 348/77 |
| 2019/0101377 | A1* | 4/2019 | White | G01B 11/14 |

FOREIGN PATENT DOCUMENTS

JP 2013-230688 A 11/2013

* cited by examiner

*Primary Examiner* — Tammy Paige Goddard
*Assistant Examiner* — Darryl V Dottin
(74) *Attorney, Agent, or Firm* — Studebaker & Brackett PC

(57) ABSTRACT

An image forming apparatus includes a sensor, an operation section, and a controller. The sensor detects a sensor target. The operation section receives an operation instruction. The controller executes a setting process for controlling the sensor. The setting process is a process to adjust a sensitivity of the sensor according to detection precision. The detection precision is a relationship in a first unit period between the number of times the sensor detects the sensor target and the number of times of the operation section receives the operation instruction.

6 Claims, 5 Drawing Sheets

| Detection time | Presence or absence of operation signal |
|---|---|
| 00:00:01 | Present |
| 00:01:00 | Absent |
| 00:10:08 | Present |
| 00:11:20 | Absent |
| 00:12:00 | Absent |
| 00:13:30 | Present |
| 00:15:47 | Present |
| 00:21:50 | Absent |

FIG. 5

IMAGE FORMING APPARATUS

INCORPORATION BY REFERENCE

The present application claims priority under 35 U.S.C. § 119 to Japanese Patent Application No. 2018-054623, filed on Mar. 22, 2018. The contents of this application are incorporated herein by reference in their entirety.

BACKGROUND

The present disclosure relates to an image forming apparatus.

Recently, image forming apparatuses have a function to be set to a power saving state in which for example power sources for some devices included therein are turned off (also referred to below as a sleep operation mode) in order to reduce power consumption. However, in a situation in which a user uses such an image forming apparatus in the sleep operation mode, it takes a waiting time to return the mode of the image forming apparatus from the sleep operation mode to a normal operation mode through touch panel input or key input. A technique using a motion sensor as described below is proposed to reduce the waiting time.

An image forming apparatus stores a detection state of the motion sensor and a state of a user using the image forming apparatus for a specific period and changes sensitivity of the motion sensor. When the motion sensor is used, mis-detection resulting in reversion to the normal operation mode from the sleep operation mode may occur due to a person who does not use the image forming apparatus approaching the image forming apparatus, besides detection resulting in normal reversion to the normal operation mode from the sleep operation mode due to a user approaching the image forming apparatus. A technique to change the sensitivity of the motion sensor is proposed to solve the above problem.

SUMMARY

An image forming apparatus according to the present disclosure includes a sensor, an operation section, and a controller. The sensor detects a sensor target. The operation section receives an operation instruction. The controller executes a setting process for controlling the sensor. The setting process is a process to adjust a sensitivity of the sensor according to detection precision. The detection precision is a relationship in a first unit period between the number of times the sensor detects the sensor target and the number of times the operation section receives the operation instruction.

BRIEF DESCRIPTION OF THE DRAWINGS

FIG. 5 is a diagram illustrating a relationship between a time of reception of a detection single and presence or absence of an operation signal.

DETAILED DESCRIPTION

Figure 1:
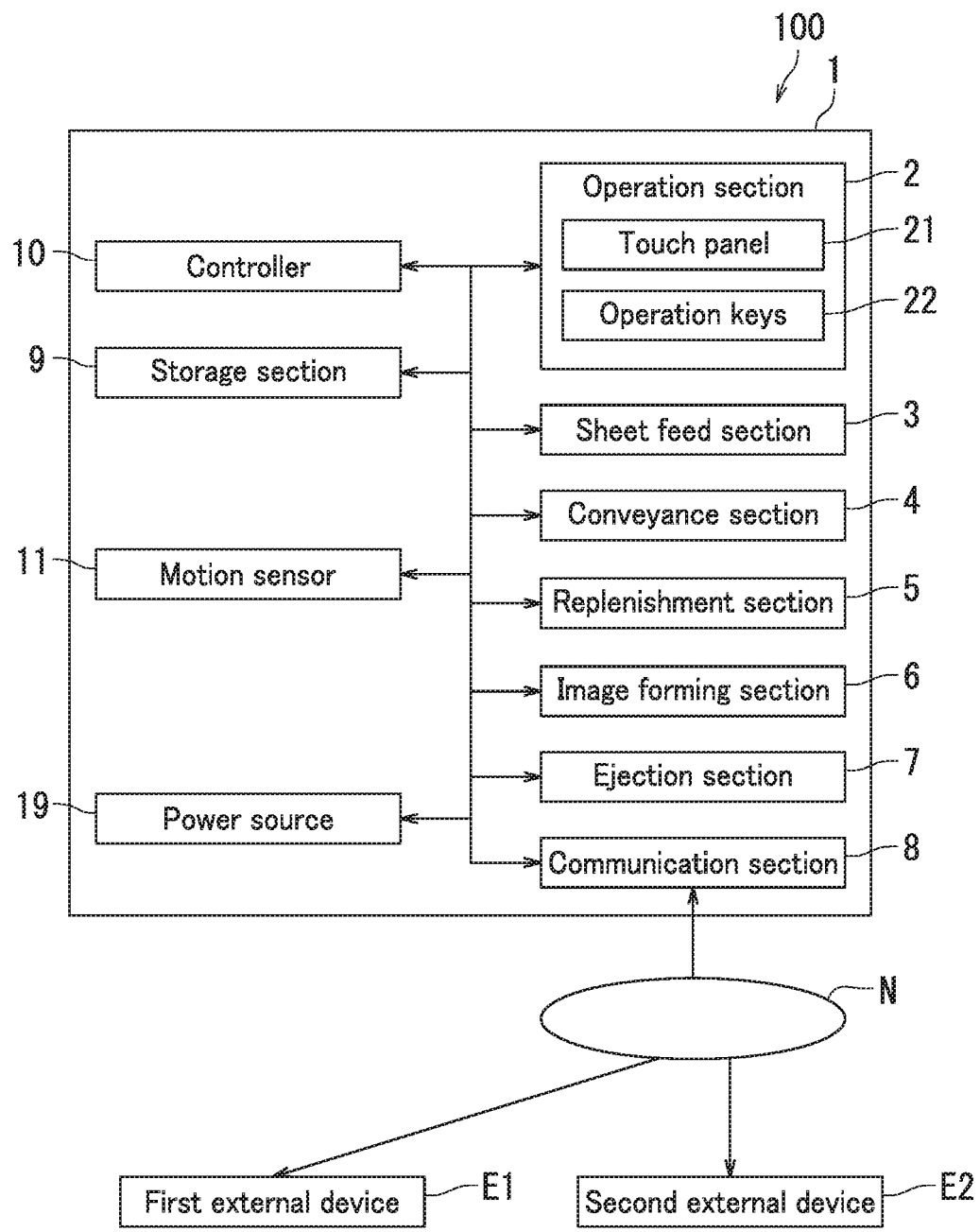
FIG. 1 is a block diagram illustrating a configuration of an image forming apparatus according to an embodiment of the present disclosure.

The following describes an image forming apparatus according to an embodiment of the present disclosure with reference to the accompanying drawings. It should be noted that elements in the drawings that are the same or equivalent are labelled using the same reference signs and description thereof is not repeated.

A configuration of an image forming apparatus 100 according to the present embodiment will be described with reference to FIG. 1. FIG. 1 is a diagram illustrating the configuration of the image forming apparatus 100. The image forming apparatus 100 is a multifunction peripheral in the present embodiment.

The image forming apparatus 100 includes a casing 1, an operation section 2, a sheet feed section 3, a conveyance section 4, a replenishment section 5, an image forming section 6, an ejection section 7, a communication section 8, a storage section 9, a controller 10, a motion sensor 11, and a power source 19. The image forming apparatus 100 forms monochrome images.

The operation section 2 receives an operation instruction to the image forming apparatus 100 from a user. Upon receiving the operation instruction from the user, the operation section 2 generates an operation signal indicating a user instruction.

The operation section 2 includes a touch panel 21 and a plurality of operation keys 22. The touch panel 21 includes a display and a touch sensor.

The display displays various screens. The various screens include a standby screen and a service screen. The standby screen includes for example a menu button for receiving instructions to execute various processes. The service screen is for example a screen for changing a setting of the image forming apparatus 100. The display is a liquid-crystal display or an organic electroluminescent (EL) display, for example.

The touch sensor detects a touch by a detection target. The touch sensor generates a position signal indicating a position where a touch by the detection target is detected. The detection target is for example a finger of the user. The touch sensor is for example a resistive touch sensor.

The operation keys 22 include for example a numeric keypad, a start key, and a cancel key.

The sheet feed section 3 accommodates a plurality of sheets, and feeds the accommodated sheets one at a time.

The conveyance section 4 conveys the fed sheet to the ejection section 7.

The replenishment section 5 replenishes the image forming section 6 with a consumable. The consumable is toner in the present embodiment.

The image forming section 6 performs image formation. Specifically, the image forming section 6 forms an image (toner image) on the sheet using the consumable. In the present embodiment, the image forming section 6 includes a light exposure device, a charger, a photosensitive drum, a development device, a cleaner, a transfer device, and a fixing device, which are not illustrated. The image forming section 6 forms images by electrophotography.

The ejection section 7 ejects the sheet with the toner image fixed thereto onto an exit tray out of the casing 1 through a sheet exit port.

The communication section 8 is capable of communicating with an electronic device including a communication device employing the same communication scheme (protocol) as that employed in the communication section 8. The communication section 8 communicates with a first external device E1 and a second external device E2 via a network N such as a local area network (LAN) in the present embodiment. The communication section 8 is for example a communication module (communication equipment) such as a LAN board.

The first external device E1 is a device that the user uses, and specifically is a personal computer or a tablet terminal device. In the present embodiment, the user operates the first external device E1 to transmit a request for the image forming apparatus 100 to execute a print job.

The second external device E2 is a device that a service person uses, for example, and specifically is a personal computer or a tablet terminal device.

The storage section 9 stores therein various data. The storage section 9 includes a storage device and semiconductor memory. The storage device includes for example either or both a hard disk drive (HDD) and a solid-state drive (SDD).

The semiconductor memory includes for example random-access memory (RAM) and read-only memory (ROM). The storage section 9 stores control programs therein.

The controller 10 includes a processor such as a central processing unit (CPU). The controller 10 also includes an integrated circuit for image formation. The integrated circuit for image formation is constituted by for example an application-specific integrated circuit (ASIC). The controller 10 controls operations of respective elements of the image forming apparatus 100 through execution of the control programs.

Once the motion sensor 11 detects that user approaches or leaves the image forming apparatus 100, the motion sensor 11 generates a detection signal and transmits the detection signal to the controller 10. The user is an example of a "sensor target", and the motion sensor 11 is an example of a "sensor".

The power source 19 supplies electric power to the respective elements constituting the image forming apparatus 100. The image forming apparatus 100 uses a normal operation mode and a sleep operation mode or a power saving mode. In the normal mode, electric power is supplied to each element constituting the image forming apparatus 100. In the sleep operation mode or the power saving mode, electric power is not supplied to some of the elements. The normal operation mode is an example of a "first operation mode", and the sleep operation mode is an example of a "second operation mode". An electric power consumption state in the normal operation mode is an example of a "first power consumption state", and an electric power consumption state in the sleep operation mode is an example of a "second power consumption state". The power source 19 transitions between the normal operation mode and the sleep operation mode according to an instruction signal output from the controller 10.

The controller 10 executes a setting process for controlling the motion sensor 11 in the present embodiment. The setting process is a process to adjust a sensitivity of the motion sensor 11 according to detection precision. The detection precision is a relationship in a first unit period Ts between the number of times the motion sensor 11 detects the sensor target and the number of times the operation signal is received. For example, the detection precision is a ratio of the number of times the operation signal is received to the number of times the detection signal is received in the first unit period Ts. The number of times the operation signal is received is the number of times the operation signal indicating the "presence" is received in a second unit period directly after signal reception detection time. The first unit period Ts is a period from a time that is a specific period before a time when the detection precision is calculated to the time when the detection precision is calculated. The controller 10 changes any of parameters (center angle Θ1, distance D1, and intensity S1) of detectable reach as parameters of the sensitivity of the motion sensor 11. Details will be described later with reference to FIGS. 2A to 5.

The following describes the setting process that the motion sensor 11 undergoes with reference to FIGS. 2A to 2D.

Figure 2A:
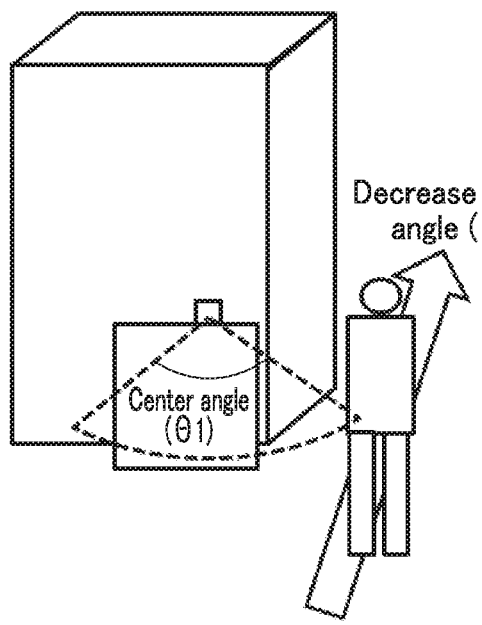
FIGS. 2A, 2B, 2C, and 2D are diagrams each illustrating a setting process that a motion sensor undergoes in the present disclosure.
Figure 2B:
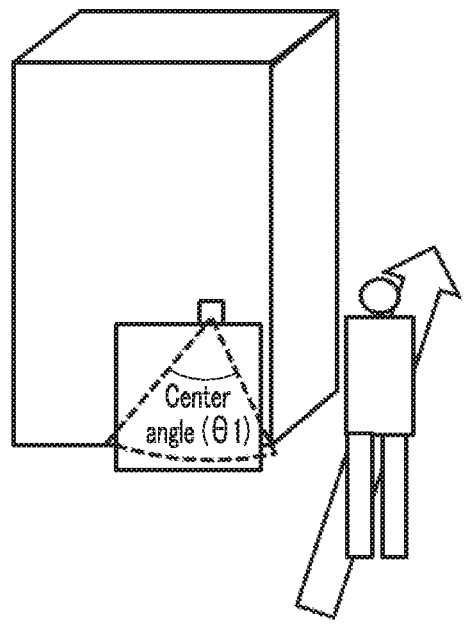

FIGS. 2A and 2B are diagrams each describing a case in which the center angle Θ1 in the detection area of the motion sensor 11 is changed. The center angle Θ1 in the detection area of the motion sensor 11 is one of the sensitivities of the motion sensor 11. The center angle Θ1 in the detection area of the motion sensor 11 is a detection angle in a horizontal direction in the embodiment of the present disclosure. When the center angle Θ1 in the detection area is decreased in a situation in which a hallway lies along the image forming apparatus 100 and many passersby come and go there, it is possible that the motion sensor 11 does not detect a passerby walking beside the image forming apparatus 100 but does detect a person approaching the front of the image forming apparatus 100 as a user.

Figure 2C:
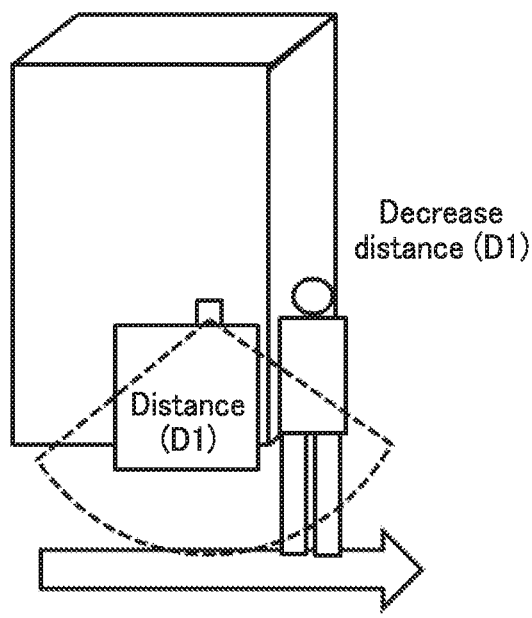
Figure 2D:
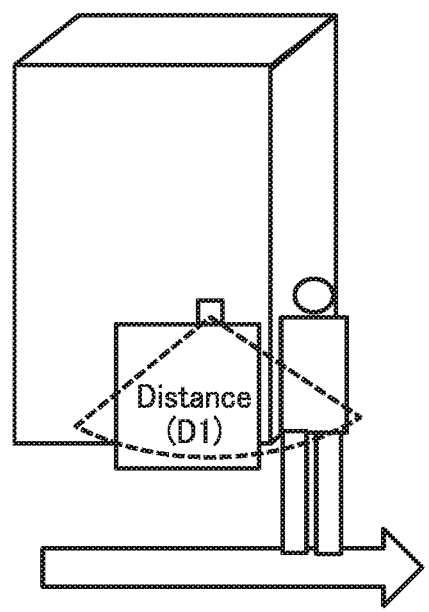

FIGS. 2C and 2D are diagrams each describing a case in which the distance D1 in the detection area of the motion sensor 11 is changed. The distance D1 in the detection area of the motion sensor 11 is one of the sensitivities of the motion sensor 11. The distance D1 in the detection area of the motion sensor 11 is a detectable distance in the embodiment of the present disclosure. When the distance D1 in the detection area is decreased in a situation in which a hallway lies along the image forming apparatus 100 and many passersby come and go there, it is possible that the motion sensor 11 does not detect a passerby walking slightly away from the front of the image forming apparatus 100 but does detect a person approaching the front of the image forming apparatus 100 as a user.

The setting process that the motion sensor 11 undergoes is described schematically with reference to FIGS. 2A to 2D. According to the embodiment of the present disclosure, the sensitivity of the motion sensor 11 can be changed so as to flexibly cope with an installation site of the image forming apparatus 100 and traffic of passersby through adjustment of either or both the central angel Θ1 and the distance D1 in the detection area as the detectable reach.

The following describes the setting process that the motion sensor 11 undergoes in detail with reference to FIGS. 1 to 5.

First, a correspondence table that is referred to in the setting process for the motion sensor 11 will be described with reference to FIG. 5. The correspondence table is an example of "reversion time information" as will be described with reference to FIG. 3.

FIG. 5 is a diagram showing a relationship between a time of reception of the detection signal by the controller 10 and presence or absence of the operation signal. The first unit period Ts is preset to 30 minutes in the present embodiment. A time when the motion sensor 11 detects of detection of the sensor target by the motion sensor 11 and whether or not the operation section 2 has generated the operation signal in the second unit period (e.g., 10 seconds) directly after the detection signal reception time are recorded in the correspondence table.

The correspondence table is stored in the storage section 9. Upon receiving the detection signal in the first unit period Ts, the controller 10 reads out the correspondence table from the storage section 9. The controller 10 writes detection signal reception time and the presence or absence of the operation signal in the second unit period from the detection signal reception time to update the correspondence table. The controller 10 stores the updated correspondence table in the storage section 9.

The controller 10 receives the detection signal in the first unit period Ts (30 minutes) eight times in the example depicted in FIG. 5. Also, the controller 10 receives the operation signal indicating "Present" in the second unit period directly after the detection signal reception time four times. A detection precision Wr, which is a ratio of the number of times the operation signal indicating "Present" is received to the number of times the detection signal is received in the first unit period Ts, is 4/8=50%. In the example depicted in FIG. 5, the first detection time is 00:00:01 and the corresponding operation signal is "Present". The second detection time is 00:01:00 and the corresponding operation signal is "Absent". The first detection and the second detection indicate a situation in which a person approaching the image forming apparatus 100 at time 00:00:01 carried out some operation on the image forming apparatus 100 and left the image forming apparatus 100 at time 00:01:00. The fourth detection time is 00:11:20 and the corresponding operation signal is "Absent". The fourth detection indicates a situation in which a person passes in front of the image forming apparatus 100 without carrying out any operation on the image forming apparatus 100.

Figure 3:
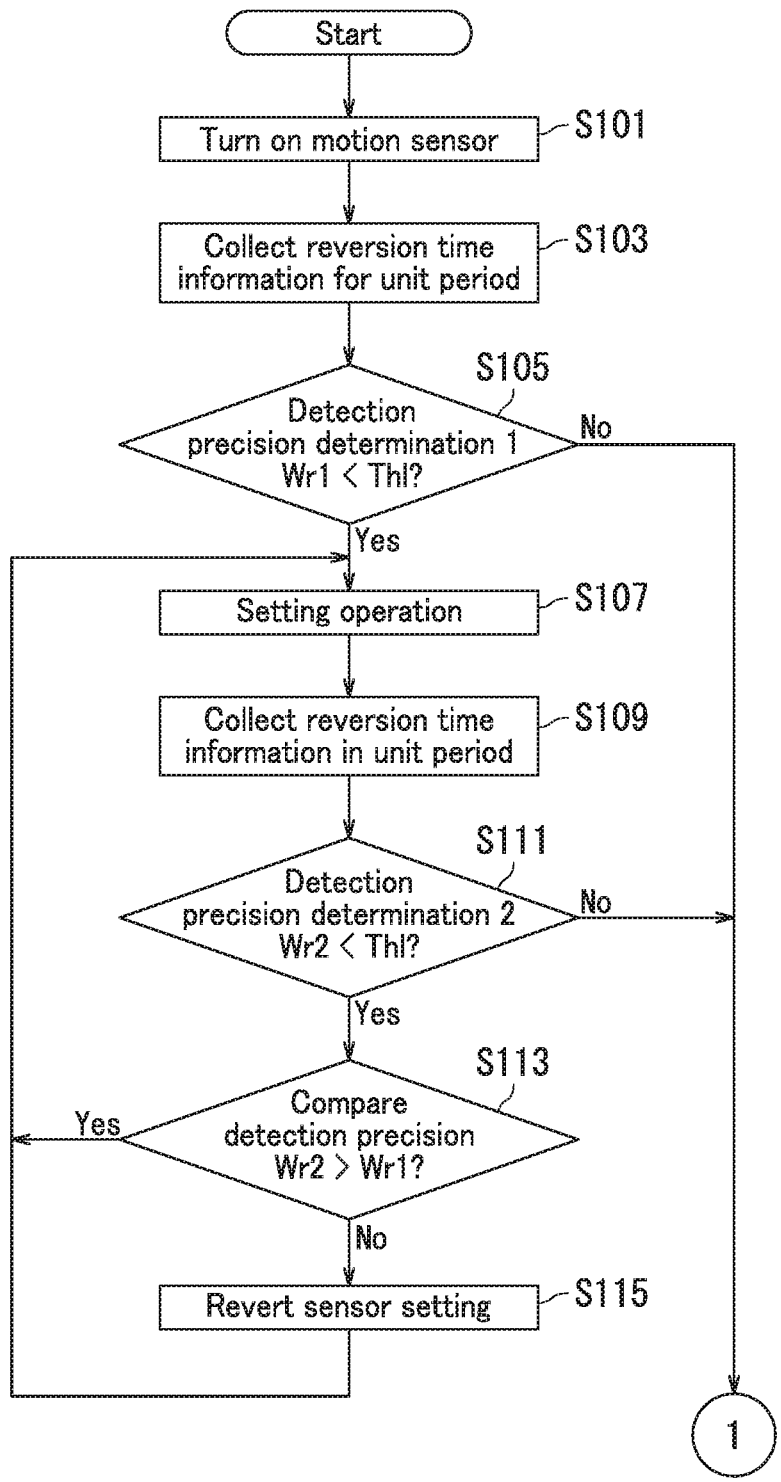
FIG. 3 is a flowchart depicting a portion of the setting process that the motion sensor undergoes.

FIG. 3 is a flowchart depicting a portion of the setting process that the motion sensor 11 undergoes in the present disclosure. For example, when the power source 19 of the image forming apparatus 100 is turned on, the controller 10 starts executing the setting process.

Step S101: The controller 10 confirms that the motion sensor 11 is operating.

Step S103: The controller 10 collects the reversion time information about operation of the motion sensor 11 during the first unit period Ts.

Step S105: The controller 10 calculates a first-time detection precision Wr1 based on the correspondence table during the first unit period Ts. Specifically, the controller 10 reads out the correspondence table from the storage section 9 in 30 minutes from time 00:00:00, confirms the number of times the detection signal is received and the number of times the operation signal is received, and calculates the detection precision Wr1. Next, the controller 10 compares the detection precision Wr1 with a lower threshold value Th1. The detection precision Wr1 is a detection precision Wr that the controller 10 calculates the first time. The lower threshold value Th1 is an example of a "first threshold value". When the detection precision Wr1 is smaller than the lower threshold value Th1 (Yes in Step S105), the routine proceeds to Step S107. When the detection precision Wr1 is not smaller than the lower threshold value Th1 (No in Step S105), the routine proceeds to Step S201. The lower threshold value Th1 is preset to 70% in the embodiment of the present disclosure.

Step S107: The controller 10 adjusts and sets the center angle Θ1, the distance D1, and the intensity S1 in the detection area of the motion sensor 11. The routine proceeds to Step S109. Note that a situation in which Wr1=0 is a situation in which no user uses the image forming apparatus 100 or appropriate setting is impossible. In the above situation, the controller 10 returns the center angle Θ1, the distance D1, and the intensity S1 in the detection area of the motion sensor 11 to the respective default values and the setting process ends.

Step S109: The controller 10 collects the reversion time information (relationship between the detection signal reception time and presence or absence of the operation signal) of the motion sensor 11 during the first unit period Ts. The routine proceeds to Step S111.

Step S111: The controller 10 calculates a detection precision Wr2 that is calculated the second time based on the correspondence table in 30 minutes from time 00:30:00 at which calculation of the detection precision Wr1 has been ended. Specifically, the controller 10 reads out the correspondence table from the storage section 9, confirms the number of times the detection signal is received and the number of times the operation signal is received in 30 minutes from time 00:30:00, and calculates the detection precision Wr2. Next, the controller 10 compares the detection precision Wr2 with the lower threshold value Th1. When the detection precision Wr2 is smaller than the lower threshold value Th1 (Yes in Step S111), the routine proceeds to Step S113. When the detection precision Wr2 is not smaller than the lower threshold value Th1 (No in Step S111), the routine proceeds to Step S201.

Step S113: The controller 10 compares the detection precision Wr2 calculated in Step S111 with the detection precision Wr1 calculated in Step S105. When the detection precision Wr2 is larger than the detection precision Wr1 (Yes in Step S113), the routine proceeds to Step S107. When the detection precision Wr2 is not larger than the detection precision Wr1 (No in Step S113), the routine proceeds to Step S115. A situation in which the detection precision Wr2 is larger than the detection precision Wr1 is a situation in which the detection precision Wr of the motion sensor 11 is improved. By contrast, a situation in which the detection precision Wr2 is not larger than the detection precision Wr1 is a situation in which the detection precision Wr of the motion sensor 11 is not improved.

According to the present disclosure, the detection precision Wr is calculated according to the presence or absence of the operation signal relative to each corresponding detection signal, with a result that effectiveness of improvement in the sensitivity can be determined. In the above configuration, three types of setting parameters of the detectable reach can be automatically changed according to whether or not effectiveness of improvement is achieved.

Step S115: The controller 10 returns the center angle Θ1, the distance D1, and the intensity S1 in the detection area of the motion sensor 11 to the respective default values. The default values are setting values for the respective detectable reaches at Step S105.

The following describes the processing in Step S107 in detail. Step S107 includes Steps S1071 to S1073.

Step S1071: The controller 10 decreases the center angle Θ1 in the detection area of the motion sensor 11 by X degrees. Whether or not the above setting is effective (whether or not the detection precision Wr is improved) is confirmed later in Step S113. When the above setting is effective, the controller 10 re-executes Step S1071 in the next execution of Step S107. When the above setting is not effective, the controller 10 skips Step S1071 and executes Steps S1072 in the next execution of Step S107.

Step S1072: The controller 10 decreases the distance D1 in the detection area of the motion sensor 11 by Y %. Whether or not the above setting is effective (whether or not the detection precision Wr is improved) is confirmed later in Step S113. When the above setting is effective, the controller 10 re-executes Step S1072 in the next execution of Step S107. When the above setting is not effective, the controller 10 skips Step S1072 and executes Steps S1073 in the next execution of Step S107.

Step S1073: The controller 10 decreases the intensity S1 in the detection area of the motion sensor 11 by Z %. Whether or not the above setting is effective (whether or not the detection precision Wr is improved) is confirmed later in Step S113. When the above setting is effective, the controller 10 re-executes Step S1073 in the next execution of Step S107. When the above setting is not effective, the controller 10 skips Step S1073 in the next execution of Step S107. Note that repetition of the step S1073 decreases the intensity S1 and the detection precision Wr1 becomes 0, with a result that no user is detected. Therefore, the controller 10 skips Step S1073 in the next execution of step S107.

The following describes the processing in Step S115 in detail. When Step S1071 is executed in Step S107, the controller 10 returns the center angle Θ1 in the detection area of the motion sensor 11 to the default value. When Step S1072 is executed, the controller 10 returns the distance D1 in the detection area of the motion sensor 11 to the default value. When Step S1073 is executed, the controller 10 returns the intensity S1 in the detection area of the motion sensor 11 to the default value.

Figure 4:
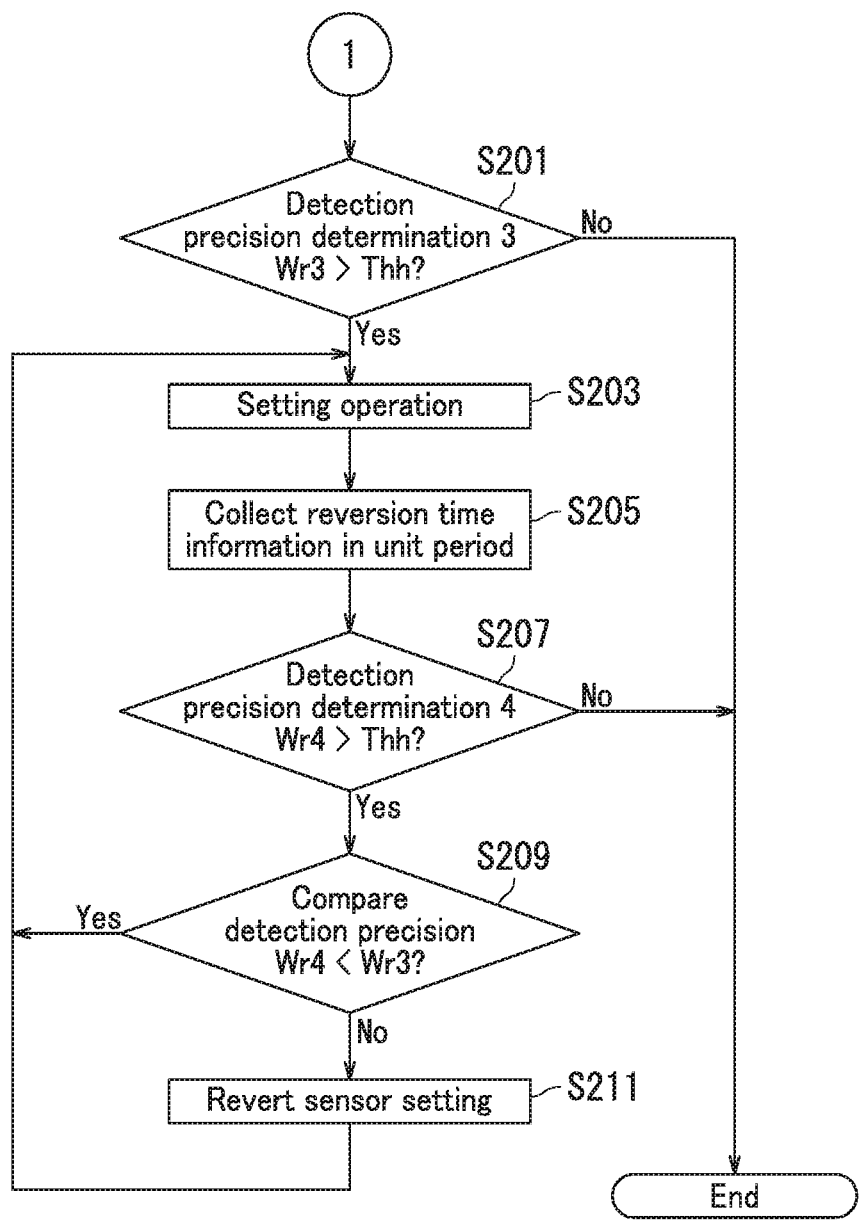
FIG. 4 is a flowchart depicting a portion of the setting process that the motion sensor undergoes.

The following describes Steps S201 to S211 of the setting process that the motion sensor 11 undergoes in the present embodiment with reference to FIG. 4.

Step S201: The controller 10 calculates a detection precision Wr3 that is calculated the third time based on the correspondence table in 30 minutes from a time A. Specifically, the controller 10 reads out the correspondence table from the storage section 9, confirms the number of times of reception of the detection signal and the number of times of reception of the operation signal in 30 minutes from the time A, and calculates the detection precision Wr3 that is a ratio of the number of times the operation signal is received to the number of times the detection signal is received. Note that the time A in a situation in which the routine proceeds from Step S105 to Step S201 is 00:00:00. Also, the time A in a situation in which the routine proceeds from Step S111 to Step S201 is 00:30:00. Next, the controller 10 compares the detection precision Wr3 with an upper threshold value Thh. When the detection precision Wr3 is larger than the upper threshold value Thh (Yes in Step S201), the routine proceeds to Step S203. When the detection precision Wr3 is not larger than the upper threshold value Thh (No in Step S201), the setting process for the motion sensor 11 ends. The upper threshold value Thh is preset to 90% in the embodiment the present disclosure. The upper threshold value Thh is an example of a "second threshold value". The lower threshold value Thl is smaller than the upper threshold value Thh.

Step S203: The controller 10 adjusts and sets the center angle Θ1, the distance D1, and the intensity S1 in the detection area of the motion sensor 11.

Step S205: The controller 10 collects reversion time information about operation of the motion sensor 11 during the first unit period Ts.

Step S207: The controller 10 calculates a detection precision Wr4 that is calculated the fourth time based on the correspondence table in 30 minutes from a time B. Specifically, the controller 10 reads out the correspondence table from the storage section 9, confirms the number of times the detection signal is received and the number of times the operation signal is received in 30 minutes from the time B, and calculates the detection precision Wr4. Note that the time B in a situation in which the routine proceeds from Step S105 to Step S201 is 00:30:00. Also, the time B in a situation in which the routine proceeds from Step S111 to Step S201 is 01:00:00. Next, the controller 10 compares the detection precision Wr4 with the upper threshold value Thh. When the detection precision Wr4 is larger than the upper threshold value Thh (Yes in Step S207), the routine proceeds to Step S209. When the detection precision Wr4 is not larger than the upper threshold value Thh (No in Step S207), the setting process for the motion sensor 11 ends.

Step S209: The controller 10 compares the detection precision Wr4 calculated in Step S207 with the detection precision Wr3 calculated in Step S201. When the detection precision Wr4 is smaller than the detection precision Wr3 (Yes in Step S209), the routine proceeds to Step S203. When the detection precision Wr4 is not smaller than the detection precision Wr3 (No in Step S209), the routine proceeds to Step S211. A situation in which the detection precision Wr4 is smaller than the detection precision Wr3 is a situation in which the detection precision Wr of the motion sensor 11 is improved. By contrast, a situation in which the detection precision Wr4 is not smaller than the detection precision Wr3 is a situation in which the detection precision Wr of the motion sensor 11 is not improved.

Step S211: The controller 10 returns the center angle Θ1, the distance D1, and the intensity S1 in the detection area of the motion sensor 11 to the respective default values. The default values are setting values for the respective detectable reaches at Step S201.

The following describes the processing in Step S203 in detail. Step S203 includes Steps S2031 to S2033.

Step S2031: The controller 10 increases the center angle Θ1 in the detection area of the motion sensor 11 by X degrees. Whether or not the above setting is effective (whether or not the detection precision Wr is improved) is confirmed later in Step S209. When the above setting is effective, the controller 10 re-executes Step S2031 in the next execution of Step S203. When the above setting is not effective, the controller 10 skips Step S2031 and executes Step S2032 in the next execution of Step S203.

Step S2032: The controller 10 increases the distance D1 in the detection area of the motion sensor 11 by Y %. Whether or not the above setting is effective (whether or not the detection precision Wr is improved) is confirmed later in Step S209. When the above setting is effective, the controller 10 re-executes Step S2032 in the next execution of Step S203. When the above setting is not effective, the controller 10 skips Step S2032 and executes Step S0233 in the next execution of Step S203.

Step S2033: The controller 10 increases the intensity S1 in the detection area of the motion sensor 11 by Z %. Whether or not the above setting is effective (whether or not the detection precision Wr is improved) is confirmed later in Step S209. When the above setting is effective, the controller 10 re-executes Step S2033 in the next execution of Step S203. When the above setting is not effective, the controller 10 skips Step S2033 in the next execution of Step S203. Note that repetition of Step S2033 increases the intensity S. In a situation in which the intensity S1 becomes maximum, the controller 10 skips Step S2033 in the next execution of Step S203.

The following describes the processing in Step S211 in detail. When Step S2031 is executed in Step S203, the controller 10 returns the center angle Θ1 in the detection area of the motion sensor 11 to the default value. When Step S2032 is executed, the controller 10 returns the distance D1 in the detection area of the motion sensor 11 to the default value. When Step S2033 is executed, the controller 10 returns the intensity S1 in the detection area of the motion sensor 11 to the default value.

As described above, the controller 10 adjusts the sensitivity between the two threshold values (upper threshold value Thh and lower threshold value Th1), and can thereby inhibit mis-detection and under-detection by the motion sensor 11 according to the present disclosure.

The setting process that the motion sensor 11 undergoes in the present disclosure is described with reference to FIGS. 1 to 5. Once the motion sensor 11 generates the detection signal or the operation section 2 generates the operation signal in a situation in which the image forming apparatus 100 is in the sleep operation mode, the controller 10 controls the power source 19 such that the mode of the image forming apparatus 100 is returned from the sleep operation mode to the normal operation mode. In the present disclosure, the controller 10 adjusts the sensitivity of the motion sensor 11 between the two threshold values. The above configuration can reduce mis-detection resulting in reversion from the sleep operation mode in a situation in which a user having no intention to use the image forming apparatus 100 approaches the image forming apparatus 100 and under-detection resulting in non-reversion from the sleep operation mode in a situation in which a user having intention to use the image forming apparatus 100 approaches the image forming apparatus 100.

Note that although the present embodiment is described using an example where the image forming apparatus 100 is a multifunction peripheral, the image forming apparatus 100 may for example be a copier or a printer.

It is possible in the present embodiment that a manufacturer of the image forming apparatus 100 sets the respective default values of the center angle $\Theta 1$, the distance D1, and the intensity S1 in the detection area of the motion sensor 11 in the storage section 9 at a time of shipping. Alternatively, a service person may set the default values using the communication section 8 through communication with the second external device E2 via the network N.

The embodiment of the present disclosure has been described so far with reference to the drawings (FIGS. 1 to 5). However, the present disclosure is not limited to the above-described embodiment and can be practiced in various ways within the scope not departing from the gist of the present disclosure. Configurations and numerical values described in the above embodiment are exemplary only and not particularly limited. The configurations and numerical values can be changed within a scope not substantially departing from the effects of the present disclosure.

Although the embodiment of the present disclosure is described using an example where the present disclosure is applied to the monochrome image forming apparatus 100, the present disclosure is applicable to for example a color image forming apparatus.

Although the embodiment of the present disclosure is described using an example where the present disclosure is applied to the electrographic image forming apparatus 100, the present disclosure is applicable to for example an inkjet image forming apparatus.

What is claimed is:

1. An image forming apparatus comprising:
a sensor configured to detect a sensor target;
a touch panel configured to receive an operation instruction; and
a controller configured to execute a setting process for controlling the sensor, wherein
the setting process is a process to adjust a sensitivity of the sensor according to detection precision,
the detection precision is a relationship in a first unit period between a number of times the sensor detects the sensor target and a number of times the touch panel receives the operation instruction,
the image forming apparatus further comprises a power source configured to cause respective elements of the image forming apparatus to operate in a first power consumption state in a first operation mode or in a second power consumption state in a second operation mode, the second operation mode being a mode in which power consumption is less than that in the first operation mode, and
upon receiving a detection signal or an operation signal, the controller outputs an instruction to cause transition from the second power consumption state to the first power consumption state to the power source, the detection signal indicating detection of the sensor target by the sensor, the operation signal indicating reception of the operation instruction by the touch panel.

2. The image forming apparatus according to claim 1, wherein
the setting process is a process to
decrease the sensitivity of the sensor when the detection precision is smaller than a first threshold value, and
increase the sensitivity of the sensor when the detection precision is larger than a second threshold value.

3. The image forming apparatus according to claim 1, wherein
the sensitivity of the sensor includes any of a center angle, a distance, and an intensity, and
the center angle, the distance, and the intensity each are a parameter of detectable reach of the sensor.

4. The image forming apparatus according to claim 1, wherein
the controller adjusts any of setting values of a center angle, a distance, and an intensity that each are a parameter of detectable reach of the sensor are adjusted.

5. The image forming apparatus according to claim 1, wherein
the controller calculates the detection precision based on a correspondence table, and
the correspondence table indicates a relationship between a time of reception of a detection signal and presence or absence of an operation signal, the detection signal indicating detection of the sensor target by the sensor, the operation signal indicating reception of the operation instruction by the touch panel.

6. The image forming apparatus according to claim 1, wherein
the sensor includes a motion sensor.

* * * * *